(12) United States Patent
Allen et al.

(10) Patent No.: US 7,523,170 B1
(45) Date of Patent: Apr. 21, 2009

(54) SERVICE LOCATOR TECHNIQUE IMPLEMENTED IN A DATA NETWORK

(75) Inventors: Robert Allen, Raleigh, NC (US); Alan B. Conley, Suisun, CA (US)

(73) Assignee: Cisco Technology, Inc., San Jose, CA (US)

( * ) Notice: Subject to any disclaimer, the term of this patent is extended or adjusted under 35 U.S.C. 154(b) by 978 days.

(21) Appl. No.: 10/180,782

(22) Filed: Jun. 24, 2002

(51) Int. Cl.
*G06F 15/16* (2006.01)
*G06F 15/173* (2006.01)

(52) U.S. Cl. .................. 709/217; 709/223; 709/246

(58) Field of Classification Search .............. 709/203, 709/230, 223, 246, 217
See application file for complete search history.

(56) References Cited

U.S. PATENT DOCUMENTS

| | | | | |
|---|---|---|---|---|
| 6,108,703 | A * | 8/2000 | Leighton et al. | 709/226 |
| 6,625,581 | B1 * | 9/2003 | Perkowski | 705/27 |
| 6,636,499 | B1 * | 10/2003 | Dowling | 370/338 |
| 2002/0038360 | A1 * | 3/2002 | Andrews et al. | 709/223 |
| 2002/0069278 | A1 * | 6/2002 | Forslow | 709/225 |
| 2002/0087707 | A1 * | 7/2002 | Stewart et al. | 709/230 |
| 2003/0195870 | A1 * | 10/2003 | Newcombe et al. | 707/3 |
| 2007/0050522 | A1 * | 3/2007 | Grove et al. | 709/246 |
| 2007/0055765 | A1 * | 3/2007 | Lisiecki et al. | 709/223 |
| 2007/0233846 | A1 * | 10/2007 | Farber et al. | 709/223 |
| 2008/0005127 | A1 * | 1/2008 | Schneider | 707/10 |

OTHER PUBLICATIONS

E. Guttman et al., "Service Location Protocol, Version 2," Network Working Group, RFC: 2608, 54 Pages, Jun. 1999.
J. Veizades et al., "Service Location Protocol," Network Working Group, RFC: 2165, 72 Pages, Jun. 1997.
ICP-1: Internet Domain Name System Structure and Delegation (ccTLD) Administration and Delegation), printed from website http://www.icann.org/icp/icp-1.htm, as it existed on May 7, 2002.
J. Postel, ISI, RFC 1591, "Domain Name System Structure and Delegation" Mar. 1994, 7 pages.
P. Mockapetris, ISI, RFC 1034, "Domain Names—Concepts and Facilities" Nov. 1987, 55 pages.
P. Mockapetris, ISI, RFC 1035, "Domain Names—Implementation and Specification", Nov. 1987, 55 pages.
Comparison of a DNS Zone and DNS Domain, printed from website http://support.microsoft.com, as it existed on Oct. 3, 2006.
Delegating Zones, printed from website http://technet2.microsoft.com, as it existed on Oct. 3, 2006.

* cited by examiner

*Primary Examiner*—John Follansbee
*Assistant Examiner*—Karen C Tang
(74) *Attorney, Agent, or Firm*—Weaver Austin Villeneuve & Sampson LLP; Dean E. Wolf (57) ABSTRACT

A service locator technique is described. According to a specific embodiment, the service locator technique may be configured to provide a distributed DNS-based service which may be used for locating services in a given enterprise, network and/or sub-network. According to one implementation, an ESL device of the present invention may be configured to use Microsoft Active Directory replication topology to determine, for example, the locality of the requester, and/or to determine a network address of the closest or most optimal service provider for that requester. Moreover, according to specific embodiments of the present invention, the service locator technique of the present invention may provide a proxy management mechanism in order to allow various network devices (e.g. DNS servers, etc.) to query selected ESL servers for desired information on behalf of any number of clients and/or proxies.

54 Claims, 7 Drawing Sheets

SERVICE LOCATOR TECHNIQUE IMPLEMENTED IN A DATA NETWORK

BACKGROUND OF THE INVENTION

The present invention relates generally to data networks, and more specifically to a service locator technique implemented in a data network.

An efficient distributed computing environment benefits from having a place to store information about people, machines, and applications that are in the environment or that use the environment. When a user logs in to a computer, for example, the computer needs to find information about the user's account, such as user authentication information (e.g., password, user ID, etc.). Additionally, when the user attempts to access an application in a network, the user's machine needs to locate the server on which the application executes. While these issues can be resolved separately, a single solution is preferable.

Directory services have been developed to address these issues. A directory service typically has two main components: a database that contains the information in the directory, and protocols that are used to access that information. One example of a directory service is the Domain Name System (DNS), which primarily functions to map names to machine addresses. DNS can perform machine address lookups rapidly and efficiently. However, DNS is less effective at generalized searches relating to machines, applications or users in the network. The Lightweight Directory Access Protocol (LDAP), and the ITU X.500 directory standard from which LDAP was derived, offer more comprehensive directory services. LDAP, unlike DNS, is explicitly designed for directories that store and access complex data, i.e., data much more complex than names and machine addresses. Most contemporary directory services are based on LDAP, which is controlled by the Internet Engineering Task Force and defined in Request For Comments (RFC) 1777 (for LDAP version 2) and RFC 2251 (for LDAP version 3).

In the Microsoft® Windows® 2000 computing environment, a service called Active Directory is intended to provide a single solution to the foregoing problems and to augment the benefits of the DNS with an LDAP-based directory. Active Directory is an LDAP-compatible directory service that is intended to provide a standard way for every application to store and retrieve information in a distributed Windows 2000 environment. Detailed information about Active Directory is provided in D. Chappell, "Understanding Microsoft® Windows® 2000 Distributed Services" (Redmond, Wash.: Microsoft Press, 2000), and is incorporated herein by reference in its entirety for all purposes.

The term Active Directory Server refers to a specific installed instance of one or more software elements that implement the Active Directory service. In a Windows 2000 environment, the term "domain" may be used to refer to a set of network resources (e.g., applications, printers, etc.). Typically, domains are configured to facilitate management of access to the set of resources. Furthermore, for fault tolerance and redundancy purposes, each domain is typically controlled by multiple domain controllers (DC). Each domain controller stores and uses a complete copy of the Active Directory database for its associated domain. Active Directory allows replication, which refers to storing and synchronizing copies of the directory database on multiple domain controllers within a single domain. Replicating directory data increases availability of that data in case of system or network failures, and can improve performance by spreading client requests across more than one directory server.

Since each domain typically has two or more domain controllers, each domain controller has a complete copy of the Active Directory database for that domain. Further, Active Directory uses multi-master replication. A client can make changes to any copy of the Active Directory database on any domain controller, and the changes automatically propagate to the directory databases maintained by all other domain controllers in that domain.

In order for Active Directory to operate effectively, the replication process requires management. Active Directory uses information about "sites" and "site links" for describing the replication topology. Sites are collections of sub-networks, or subnets, with fast, reliable connectivity, which typically means high-speed LAN connections. Thus, for example, a site may comprise a plurality of Ethernets that are at the same general physical location. In addition, multiple subnets can be represented by a single high-level network prefix or "address block". Site links are connections between sites, and typically have an associated cost. The use of sites allows clients to find the closest desired network device for a particular application. For example, the use of sites allows clients to find the closest domain controller, global catalog server (GC), distribute file system (DFS) share point or application distribution point (via Short Message Service [SMS]), etc.

A common problem associated with many large corporate IT departments relates to distributed service location techniques for providing a scaleable way to have clients and/or servers locate the closest server which is providing a particular function or service (e.g., DNS, VOD, WEB, etc.). Cisco Systems of San Jose, Calif., currently offers a Distributed Director (DD) product for implementing distributed service location functionality. Distributed Director distributes Internet services among globally dispersed Internet server sites by using information obtained from Internet router-based infrastructure, standard domain name services (DNS), and hypertext transfer protocol (HTTP).

Figure 1:
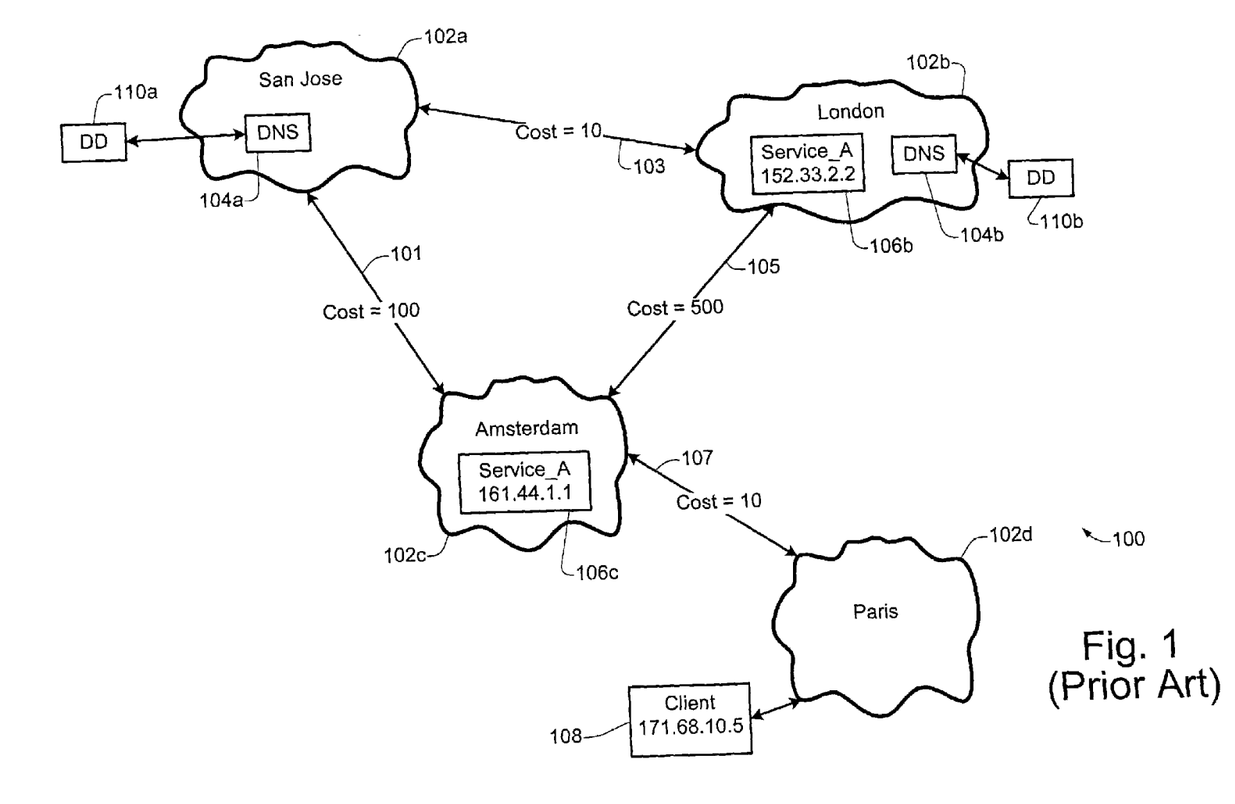
FIG. 1 shows an example of a conventional network topology 100.

FIG. 1 shows an example of a conventional network topology 100 which may be used to implement a recursive DNS process using Distributed Director. It is assumed in the example of FIG. 1 that the network 100 corresponds to a portion of a company wide area network (e.g., cisco.com). In the example of FIG. 1, a plurality of different logical network sites 102 are depicted. Various links (e.g. 101, 103, 105, 107) between each site are also shown, with each link having an associated cost with regard to specific routing metrics. In the example of FIG. 1, it is assumed that a user at client 108 desires to access a specific service or service provider having an associated name of "Service_A".

As used in this application, the term service or service provider may be used to describe to a device or system which provides a specific type of service or function. Each different type of service provider may have an associated name for identifying the type of service or function provided. In the example of FIG. 1, it is assumed that a user a client 108 desires to access a service provided identified as "Service_A". Accordingly, client 108 (whose associated IP address is 171.68.10.5) sends a DNS query to the nearest (i.e. least costly) DNS server in the network, which, in the example of FIG. 1, is DNS server 104a. The DNS query from client 108 will include a lookup request for the domain name "Service_A.cisco.com".

When DNS server 104a receives the lookup request for the domain name Service_A.cisco.com, it recognizes the domain name as a delegated domain, and passes the DNS query to the Distributed Director device 110a. Conventionally, when the Distributed Director device receives a lookup request for a delegated domain from a particular DNS server, it will respond by providing the IP address of the closest service provider to the requesting DNS server which provides the requested service. Thus, in the example of FIG. 1, the Distributed Director device 110a recognizes that DNS server 104a is requesting the location of the closest service provider associated with the service "Service_A". The Distributed Director device 110a has no knowledge that the DNS server 104a is requesting this information on behalf of client 108. Accordingly, the Distributed Director device 110a responds to the DNS query by providing an IP address of 152.33.2.2 to the DNS device 104a. This IP address corresponds to Service_A service provider 106b located at the London site, which represents the least costly link to a Service_A service provider from DNS server 104a. The DNS server 104a will then respond to the DNS query from client 108 by providing the IP address of Service_A service provider 106b (e.g., 152.33.2.2). Thereafter, client 108 will communicate directly with Service_A 106b, even though there is a closer, less costly service provider for Service_A at 106c.

As illustrated in the example of FIG. 1, one problem associated with conventional service location protocols (such as Distributed Director) is that such protocols provide only limited service location functionality which do not necessarily result in locating a closest or most optimal service provider on behalf of a particular client (e.g. client 108). Additionally, another problem is that Distributed Director does not lend itself to be a programmatic interface. For example, one cannot easily use a service configured in Distributed Director to provision servers with IP addresses of the closest server.

Other protocols and methodologies (besides Distributed Director) have been proposed which attempt to provide service location functionality. Such other protocols include Service Location Protocol (RFC 2165), and Service Location Protocol, Version 2 (RFC 2608). However, these other proposed solutions do not provide true "optimal" service location, and are typically much more difficult to deploy than conventional service location techniques such as Distributed Director. Moreover, most conventional service location protocols are dependent upon real-time agents being deployed and queried in order to maintain updated network topology information. This is undesirable since it increases complexity and requires utilization of additional resources.

Based on the foregoing, it is apparent that there exists a need to improve upon distributed service locating techniques in order to facilitate communication between devices in data networks.

SUMMARY OF THE INVENTION

According to different embodiments of the present invention, various methods, systems, and computer program products are described for providing distributed service location information to selected network devices. A lookup request is received at a device which is configured to implement various aspects of the present invention. The lookup request includes a delegated domain portion. A first portion of the delegated domain includes a service locator identifier corresponding to a service location service. The lookup request further includes additional information prepended to the delegated domain. Using the additional information, appropriate response to the lookup request is generated. According to a specific embodiment, the additional information may also include service identifier information for identifying a desired service or service provider.

According to one embodiment, the additional information may include address information relating to a first network address of a first network device. Using the address information, a response may be generated which includes a second network address corresponding to a second network device. The second network device may correspond to an optimal service provider location which provides the desired service, wherein the optimal service provider location is determined to be optimal relative to the first network device. According to a specific implementation, the lookup request is received from a DNS server; and the first network device corresponds to a client or proxy device.

In alternate embodiments of the present invention, the additional information may include a variety of other information requests including, for example, a ranking information (N) request relating to an Nth most optimal service provider location which provides the desired service; a multiple service provider location request portion for requesting locations of multiple service provider locations which provide the desired service; a hostname request portion for requesting an identity of a network device which generates the response; a site identification request portion for requesting an identity of a network site associated with a specific network address; a version request portion for requesting an identity of a current protocol implemented at a device which generates the response; etc.

According to specific embodiments, each of the additional portions of information may be prepended to the delegated domain portion of the lookup request according to a format which is compatible with a standardized DNS protocol. In this way the technique of the present invention is able to be implemented in conventional networks in order to provide additional functionality to such networks.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Different embodiments of the present invention describe various aspects of an enterprise service locator (ESL) technique of the present invention. According to one implementation, the service locator technique of the present invention may be configured to provide a distributed DNS-based service which may be used for locating services in a given enterprise, network and/or sub-network. In the context of the present application, the term "service" or "service provider" may be used to refer to a variety of different services functions and/or processes which, for example, may be implemented on one or more network devices (e.g., DNS servers, trap servers, VOD servers, web servers, etc.). According to one implementation, an ESL device of the present invention may be configured to use Microsoft Active Directory replication topology to determine, for example, the locality of the requester, and/or to determine a network address of the closest or most optimal service provider for that requestor. Moreover, according to specific embodiments of the present invention, the service locator technique of the present invention may provide a proxy management mechanism in order to allow various network devices (e.g. DNS servers, etc.) to query selected ESL servers for desired information on behalf of any number of clients and/or proxies.

Figure 2:
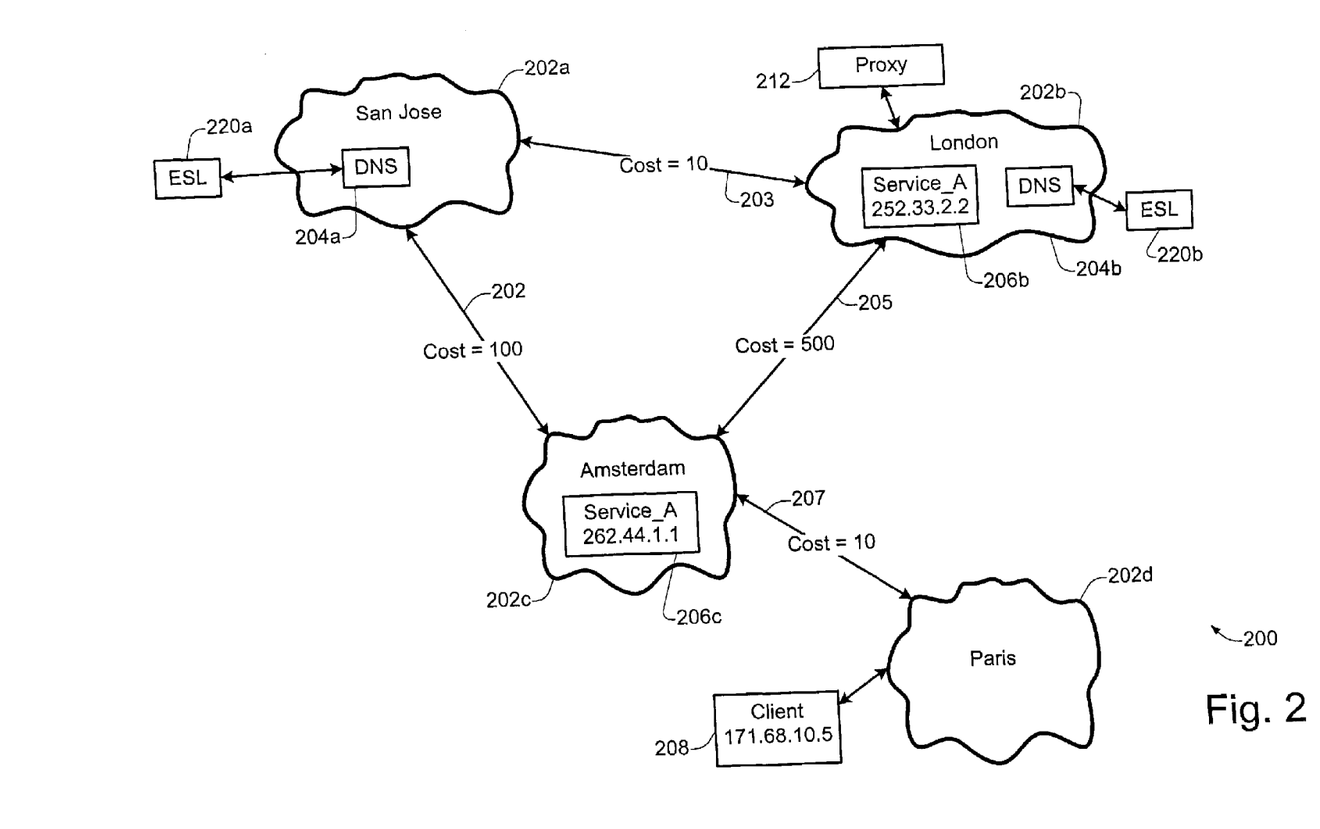
FIG. 2 shows a portion of a network topology 200 which may be used for illustrating various aspects of the present invention.

FIG. 2 shows a portion of a network topology 200 which may be used for illustrating various aspects of the present invention. It is noted that the network topology of FIG. 2 is similar to the network topology illustrated in FIG. 1, however, the Distributed Director devices (110a, 110b) of FIG. 1 have been replaced by ESL devices (e.g., ESL servers 220a, 220b), as shown in FIG. 2.

According to a specific implementation, the ESL servers 220a, 220b may be configured to communicate with the DNS servers 204a, 204b using a DNS compatible syntax which allows the DNS servers to retrieve a variety of information from the ESL servers. For example, according to one implementation, a DNS server is able to query an ESL server for information relating to a nearest or most optimal service provider for a requesting client or proxy. In alternate embodiments of the present invention, the DNS server may query the ESL server for a variety of other information such as, for example, ranking information relating to an Nth most optimal service provider location which provides a desired service; multiple service provider location information relating to locations of multiple service provider locations which provide the desired service; hostname information relating to an identity of the ESL server being queried; site identification information relating to an identity of a network site associated with a specific network address (such as a client or proxy network address); version information relating to the identity of the current version of software being implemented at the ESL server; information relating to why a particular route is considered by the ESL server to be an optimal route; etc.

In order to illustrate various aspects of the present invention, a discussion of the service locator technique of the present invention will now be described by way of example with respect to the network topology illustrated in FIG. 2. In this example, it is assumed that a user at client 208 desires to find the closest or most optimal service provider associated with the service: Service_A.

Figure 3A:
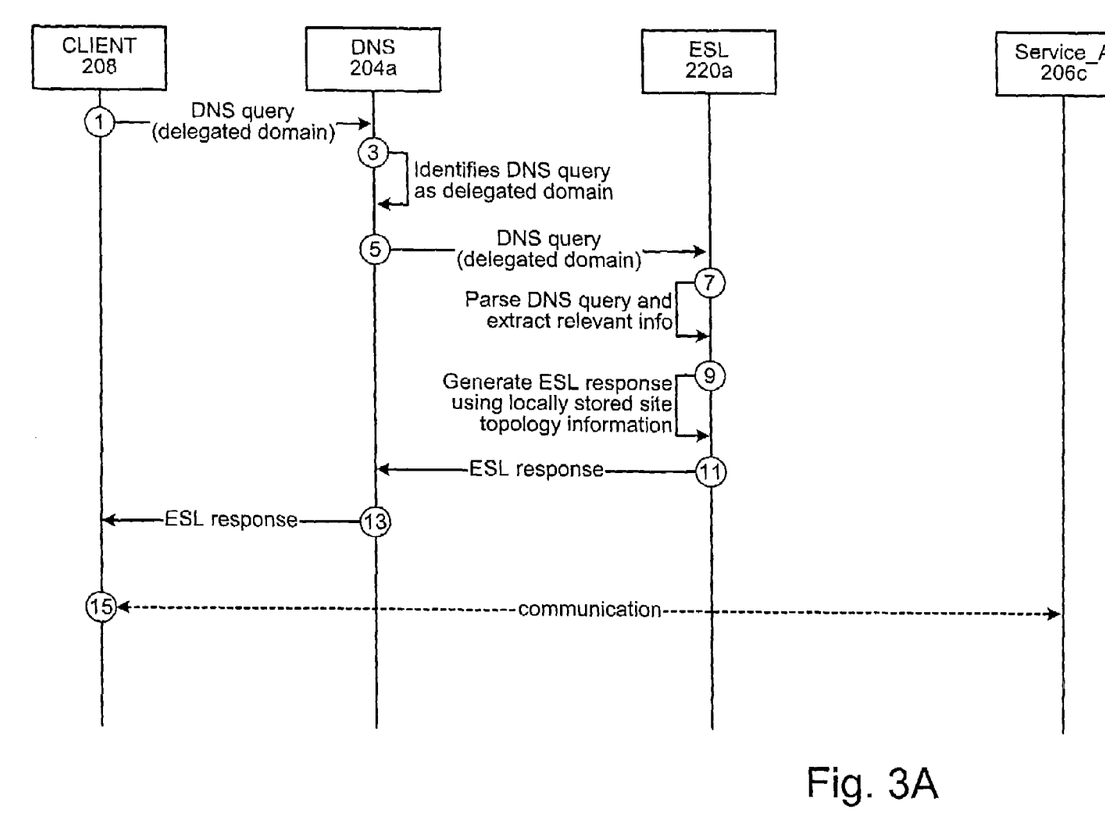
FIG. 3A shows a flow diagram illustrating various interactions which may be performed between various network devices during implementation of a specific embodiment of the service locator technique of the present invention.

FIG. 3A shows a flow diagram illustrating various interactions which may be performed between various network devices during implementation of a specific embodiment of the service locator technique of the present invention. For purposes of illustration, the flow diagram of FIG. 3A will be described using the network topology example of FIG. 2.

Initially, client 208 sends (1) a DNS query to the closest DNS server, which, in the example of FIG. 2, corresponds to DNS server 204a. In this example, it is assumed that the DNS query corresponds to a lookup request for the domain name: Service_A.esl.cisco.com. According to a specific embodiment, the client 208 may correspond to a network device such as, for example, a network management station.

When the DNS server 204a receives the DNS query from client 208, it identifies (3) the DNS query as a delegated domain. According to one embodiment, the received DNS query may then be forwarded (5) to the ESL server 220a to be resolved. In such an embodiment, the ESL server 220a may be configured or designed to communicate with the DNS server 204a using a DNS compatible syntax and/or protocol. According to an alternate embodiment, the DNS server 204a may modify the DNS query and send the modified DNS query to the ESL server 220a.

Figure 3B:
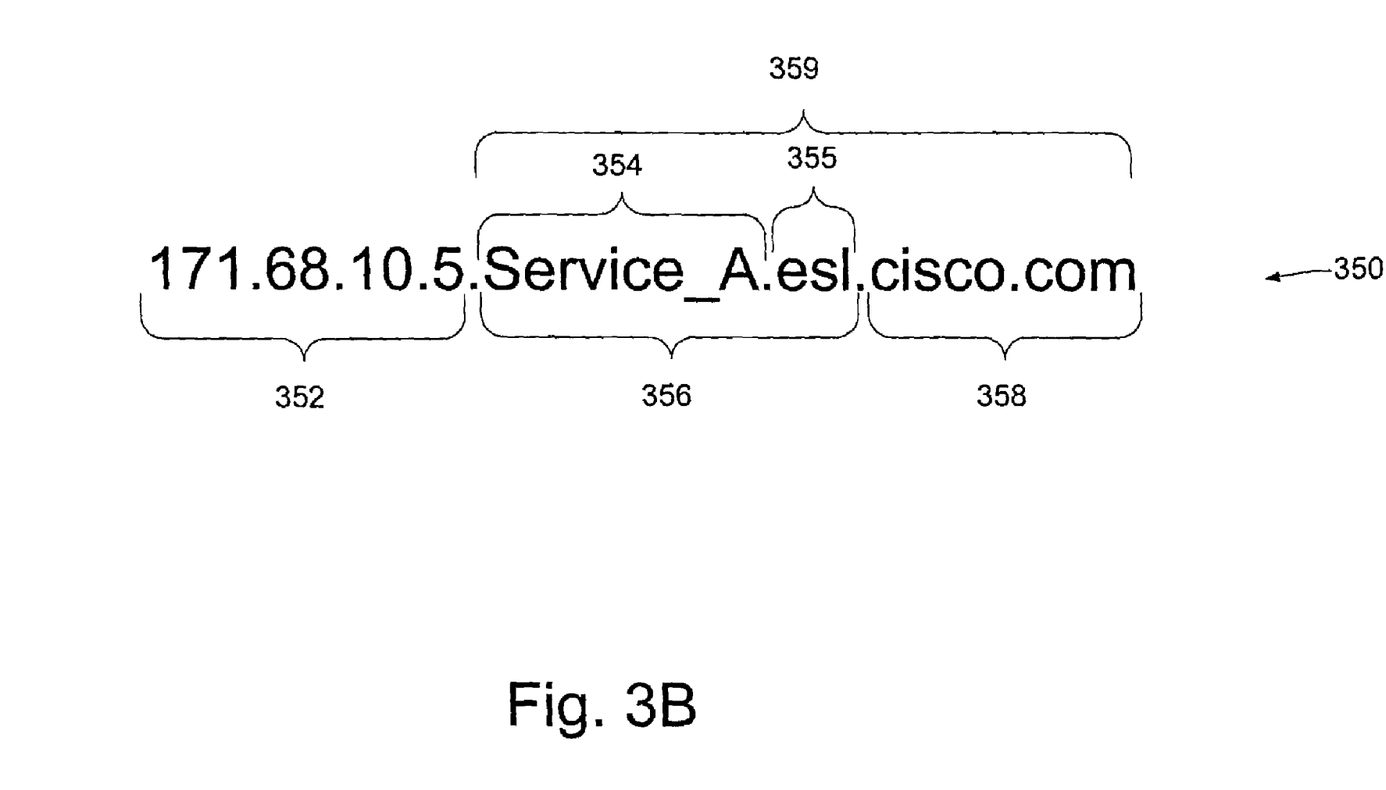
FIG. 3B shows an example of an DNS query 350 in accordance with a specific embodiment of the present invention.

FIG. 3B shows an example of an DNS query 350 in accordance with a specific embodiment of the present invention. As illustrated in FIG. 3B, the DNS query 350 includes a domain portion 359 and a client or proxy address portion 352. According to a specific implementation, the client/proxy address portion 352 corresponds to the IP address of the client or proxy (e.g. client 208) for which the DNS server 204a is performing the lookup of the specified delegated domain. As shown in the embodiment of FIG. 3B, the domain portion 359 includes a hostname or domain name portion 358 (e.g. cisco.com), and a sub-domain portion 356 (e.g., Service_A.esl). In the example of FIG. 3B, portion 355 of the DNS query may be used to identify the service locator service (i.e., esl), and portion 354 of the DNS query may be used to identify the requested service or service provider (i.e., Service_A). According to a specific implementation, a respective service locator service may be associated with selected DNS hostnames. For example, in the embodiment of FIG. 2, the service locator service associated with the Cisco network portion 200 may be accessed using the domain: esl.cisco.com.

Returning to FIG. 3A, when the ESL server receives the DNS query, it parses (7) the DNS query and extracts relevant information such as, for example, the requested service, the identity of the requestor, etc. The ESL server 220a may then generate (9) an ESL response using information extracted from the ESL query and locally stored site topology information. In the example of FIG. 2, the ESL server 220a will recognize that the ESL query corresponds to a request to provide the address location corresponding to the most optimal Service_A service provider for the client associated with IP address 171.68.10.5, and will therefore. Accordingly, in the example of FIG. 2, the ESL server 220a will identify Service_A 206c as being the most optimal server for client 171.68.10.5, and will therefore include the Service_A IP address of 262.44.1.1 in the ESL response.

According to a specific embodiment, the ESL response may be formatted using a DNS compatible syntax. The ESL response is then sent (11) from the ESL server 220a to the DNS server 204a, whereupon the ESL response is then forwarded (13) to the requesting client 208. Since the ESL response is formatted using DNS compatible syntax, the client 208 is able to properly interpret the ESL response, and to use the information provided in the ESL response to initiate communication with the Service_A server 206c.

It will be appreciated that the example above describes one scenario of the technique of the present invention wherein the DNS server 204a is able to query the ESL server 220a for a specified service provider on behalf of a particular client, and wherein the query received at the ESL server includes information identifying both the requested service (e.g. Service_A) and the requesting client (e.g., client 208). In this embodiment, the client 208 may send a DNS query as shown in FIG. 3B to the DNS server. In this embodiment, the client 208 has prepended its own IP address to the DNS query. When the DNS server receives the DNS query (as illustrated in FIG.

3B), the DNS server will recognize that the DNS query corresponds to a delegated domain, and may then forward the DNS query to the ESL server 220*a* for handling. In an alternate embodiment, the requesting client 208 may send a DNS query of Service_A.esl.cisco.com to the DNS server 204*a*, and the DNS server may then prepend the client IP address to the DNS query, resulting in a modified DNS query (as shown in FIG. 3B) being sent to the ESL server 220*a*.

In yet another embodiment, a proxy device such as, for example, proxy 212 of FIG. 2 may query a particular DNS server for an optimal service provider location on behalf of a particular client. For example, proxy 212 may send a DNS query on behalf of client 208 to DNS server 204*b*, wherein the DNS query corresponds to query 350 of FIG. 3B. When the DNS server 204*b* receives the DNS query from proxy 212, it will forward the DNS query to ESL server 220*b*. The ESL server 220*b* will interpret the DNS query as a request for the most optimal Service_A server location for IP address 171.68.10.5, and will respond by providing the IP address 262.44.1.1 which corresponds to the Service_A server 206*c*. In a specific embodiment where there is no proxy or client address portion 352 in a particular DNS or ESL query, the ESL server may respond with a location of the most optimal server for the requested service based upon the requestor's IP address which, in this case, may correspond to the DNS server which forwarded or sent the lookup request to the ESL server.

According to alternate embodiments of the present invention, additional information may be prepended to the domain portion 359 of a DNS or ESL query in order to retrieve desired information from an ESL server. For example, additional codes may be prepended to the domain portion 359 of a DNS or ESL query in order to cause the ESL server to provide a variety of other information such as, for example, information relating to other recommended server locations for a requested service; information relating to particular routing metrics associated with the network topology; hostname information relating to an identity of the ESL server being queried; site identification information relating to an identity of a network site associated with a specific network address (such as a client or proxy network address); version information relating to the identity of the current version of software being implemented at the ESL server; information relating to why a particular route is considered by the ESL server to be an optimal route; etc.

It will be appreciated that the service locator technique of the present invention of the present invention provides greater flexibility than conventional service location solutions such as Distributed Director. Moreover, the service locator technique of the present invention provides a relatively simple solution to the problem of locating the most optimal service location for a given service provider and a given client. Since the service locator technique of the present invention may be implemented using DNS-based syntax and protocol, it may be easily deployed and used in existing networks. According to one embodiment, the service locator technique of the present invention may be implemented in a non-intrusive manner such that it relies on external information (e.g. either from Active Directory replication topology or from networking router configuration files), which is not dependent upon the use of real-time agents being deployed and queried (as with conventional service location techniques). In alternate embodiments of the present invention, different network topologies may be plugged into desired ESL servers in order to allow different levels of granularity to be used in determining how to locate/provision one or more specified services. For example, it may be desirable to implement a topology which has granularity at the subnet level at selected ESL servers. This may be useful, for example, for locating the closest printer on a floor. Alternatively, it may be desirable to implement a topology which has less granularity at selected ESL servers.

Sometimes it may be desirable to find a second most optimal server or a third most optimal server which provides a specific service. In such cases, clients may specify the server ranking N, for example, by prepending the number of the ranking to the front of the service name. Thus, for example, referring to FIG. 2, the second most optimal server for Service_A may be located by using the request "2.Service_A.esl.cisco.com". Alternatively, if the client desires an entire list of servers for a particular service, the client may prepend the code "all" to the front of the service name as shown: "all.Service_A.esl.cisco.com". According to a specific implementation, the list returned by the ESL server in response to the "all" request may include a list of all the known servers associated with the Service_A, ordered from the most optimal server to the least optimal server with respect to the requestor.

According to specific embodiments, the ESL server may use the source IP address of the DNS query to determine where to source the site cost for the queried service. However, this may be overwritten by specifying an IP address at the front of the service name, as illustrated, for example, in FIG. 3B of the drawings. In one implementation, this feature may be used in conjunction with the server ordering feature, for example, by placing the desired order number in front of the IP address. For example, the query "2.171.68.10.5.Service_A.esl.cisco.com" may be used to request the second most optimal location for a Service_A server for client 208. Alternatively, the query: "all.171.68.10.5.Service_A.esl.cisco.com" may be used to obtain a list of all servers associated with Service_A. In one implementation, the results may be ordered from most optimal server to least optimal server relative to client 208.

According to an alternate embodiment of the present invention, additional information may be retrieved from the ESL server using specific syntax. For example, inserting the code "hostname" into the service provider portion of the query (e.g., hostname.esl.cisco.com) may be used to allow a client to obtain information about with identity of the ESL server(s) which is/are servicing that client's request(s). Inserting the code "site" into the service identifier portion of the query (e.g., site.esl.cisco.com) may be used by a client to obtain information about the site in which that client is located. According to a specific embodiment, if an IP address is prepended to this latter query (e.g., 152.33.2.2.site.esl.cisco.com), the site associated with the specified IP address (e.g., London) may be returned. If a "version" code is inserted into the service identifier portion of the query (e.g., version.esl.cisco.com), the current version of the software and/or hardware running on the ESL server may be returned.

According to a specific embodiment, the service locator technique of the present invention may be implemented as a web-based service. Additionally, according to a specific embodiment, the service locator technique of the present invention may be configured to provide a programmatic interface (e.g., via DNS) to allow for configuration of service IPs for remote servers.

In addition to the features and advantages described above, the service locator technique of the present invention may also be configured to include an integrated security model so that service owners can manage their own lists of servers in the ESL environment. In contrast, conventional service location techniques, such as Distributed Director, service information that is typically managed by a central networking team, as opposed to individual service owners. Additionally, according to a specific implementation, the service locator technique of the present invention may be configured to include a Perl module which may be used by some application developers to programmatically manage a service's server list.

Figure 4:
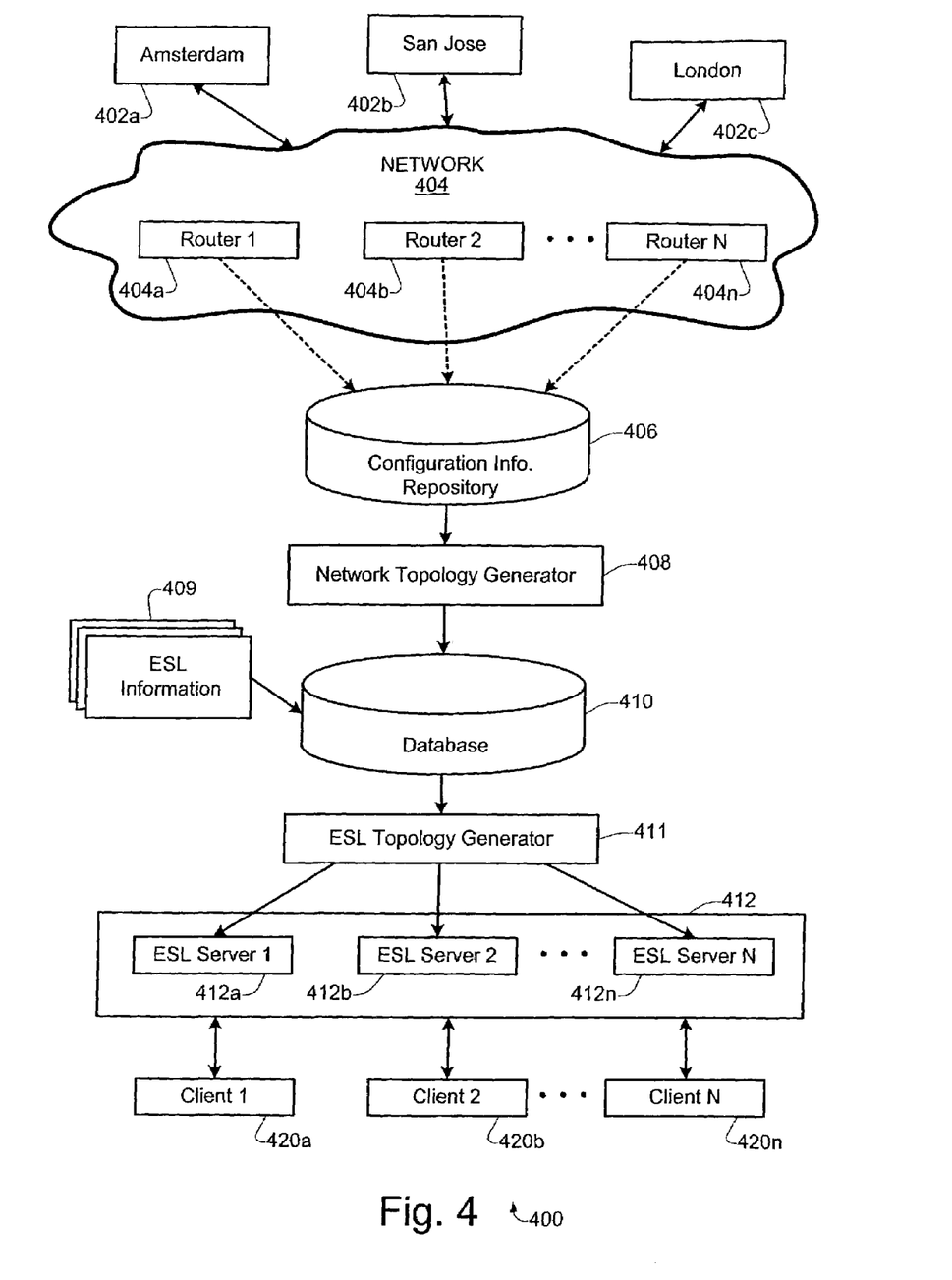
FIG. 4 shows a block diagram illustrating how network topology information and service provider information may be collected, integrated, and distributed in accordance with a specific embodiment of the present invention.

FIG. 4 shows a block diagram illustrating how network topology information and service provider information may be collected, integrated, and distributed in accordance with a specific embodiment of the present invention. As illustrated in FIG. 4, a plurality of different sites 402a, 402b, 402c may communicate with each other via network 404. The network 404 includes a plurality of routers (404a, 404b, 404n). Each router may include one or more configuration files for use in handling and/or managing network traffic. Information from the router configuration files are downloaded to a central information repository 406. Information stored at the central repository 406 may then be used by a site topology generator 408 for generating network and/or site topology information. According to a specific embodiment, the site topology information may be based on information stored in the router configuration files. In one implementation, the site and/or network topology information may be generated using a technique described in U.S. patent application Ser. No. 09/886,851, entitled "Automatically Generating Replication Topology Information for Use by a Directory Service", filed Jun. 20, 2001, the entirety of which is incorporated herein by reference for all purposes. According to the technique described in U.S. patent application Ser. No. 09/886,851, network topology information (e.g., network sites, site links, etc.) may be automatically generated for use in a directory service (such as, for example, Microsoft Active Directory) using router interface information obtained from router configuration files.

The network topology information generated by network topology generator 408 may then be stored in a database 410. Enterprise service locator (ESL) information 409, relating to different service providers, may also be stored at database 410. According to a specific embodiment, the front-end of the enterprise service locator information for a particular service may be managed by respective entities responsible for providing those particular services. In one implementation, service provider administrators may configure ESL services associated with different hosts via a web front-end interface. The configured ESL service information may be stored at database 410.

An ESL topology generator 411 may then be used to create and/or update associations between the network topology information (provided by the network topology generator 408) and service provider information (provided, for example, by the ESL information 409).

Figure 5:
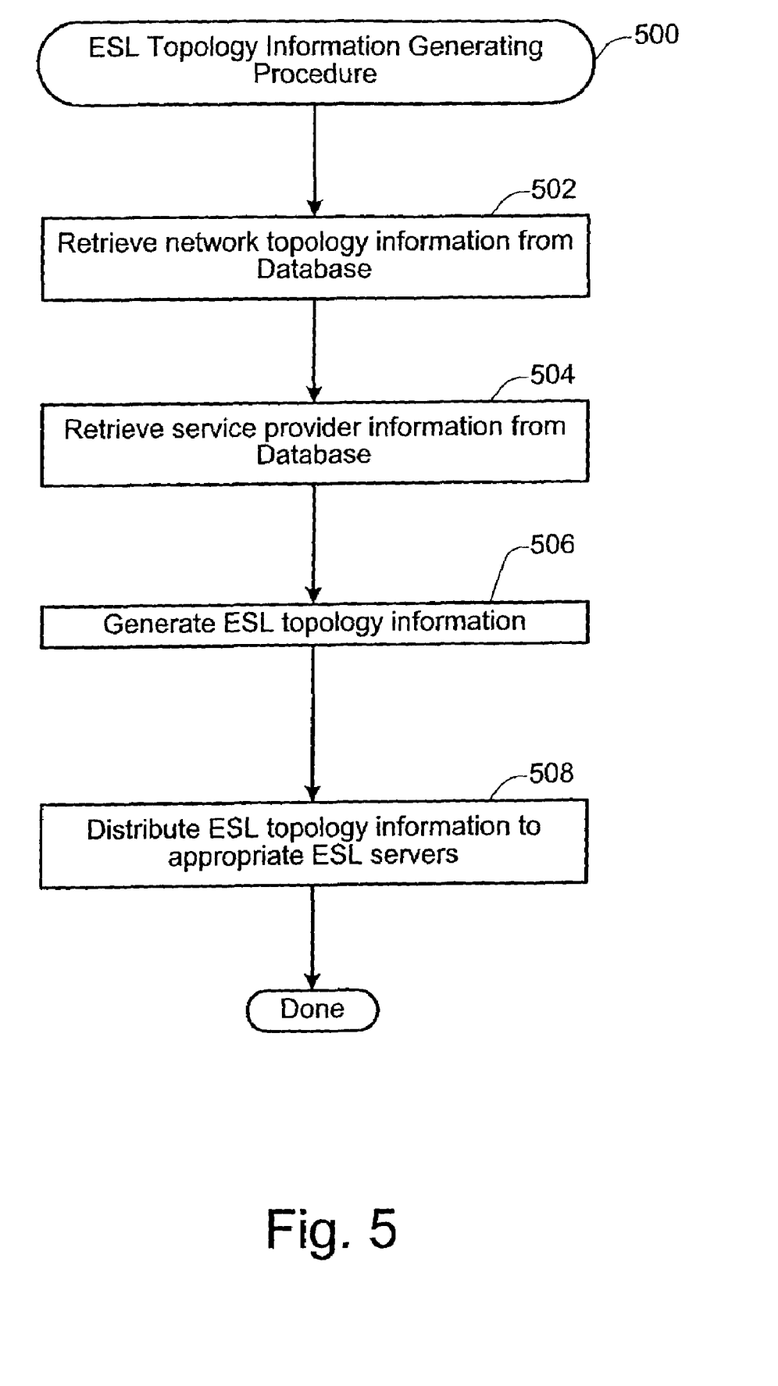
FIG. 5 shows a flow diagram of an ESL Topology Information Generating Procedure 500 in accordance with a specific embodiment of the present invention.

FIG. 5 shows a flow diagram of an ESL Topology Information Generating Procedure 500 in accordance with a specific embodiment of the present invention. In one implementation, the procedure 500 of FIG. 5 may be implemented at the ESL topology generator 411 of FIG. 4. At 502, network topology information is retrieved from a database (e.g. database 410). According to a specific implementation, the network topology information may include information such as network sites with associated lists of IP networks, site links with associated costs, etc. At 504, service provider information is retrieved from the database 410. According to a specific implementation, the service provider information may include information relating to an identity of different service providers, IP addresses of each identified service provider, etc. The retrieved network topology information and service provider information may then be used to generate (506) ESL topology information. According to one embodiment, the generation of the ESL topology information may include creating and/or updating associations between the network topology information and service provider information. For example, in one embodiment, changes in the network topology information or service provider information which are detected may be used to generate updated ESL topology information. The generated ESL topology information may then be distributed (508) to appropriate ESL servers at periodic intervals. For example, according to one implementation, updated site topology information may be distributed every 24 hours, and updated service provider information along with their associated sites may be distributed every 15 minutes.

As shown in FIG. 4, the updated ESL topology information is distributed to appropriate ESL servers 412 in the network. According to a specific embodiment, each of the plurality of ESL servers 412 may receive identical ESL topology information from the ESL topology generator 411. Clients may then query the ESL servers in order to find a closest or most optimal service provider of a desired service using, for example, the technique described previously with respect to FIG. 2 of the drawings.

Other Embodiments

Generally, the service locator techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the service locator technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the ESL devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the service locator technique of this invention may be implemented on a general-purpose network host machine such as a personal computer or workstation. Further, the invention may be at least partially implemented on a card (e.g., an interface card) for a network device or a general-purpose computing device.

Figure 6:
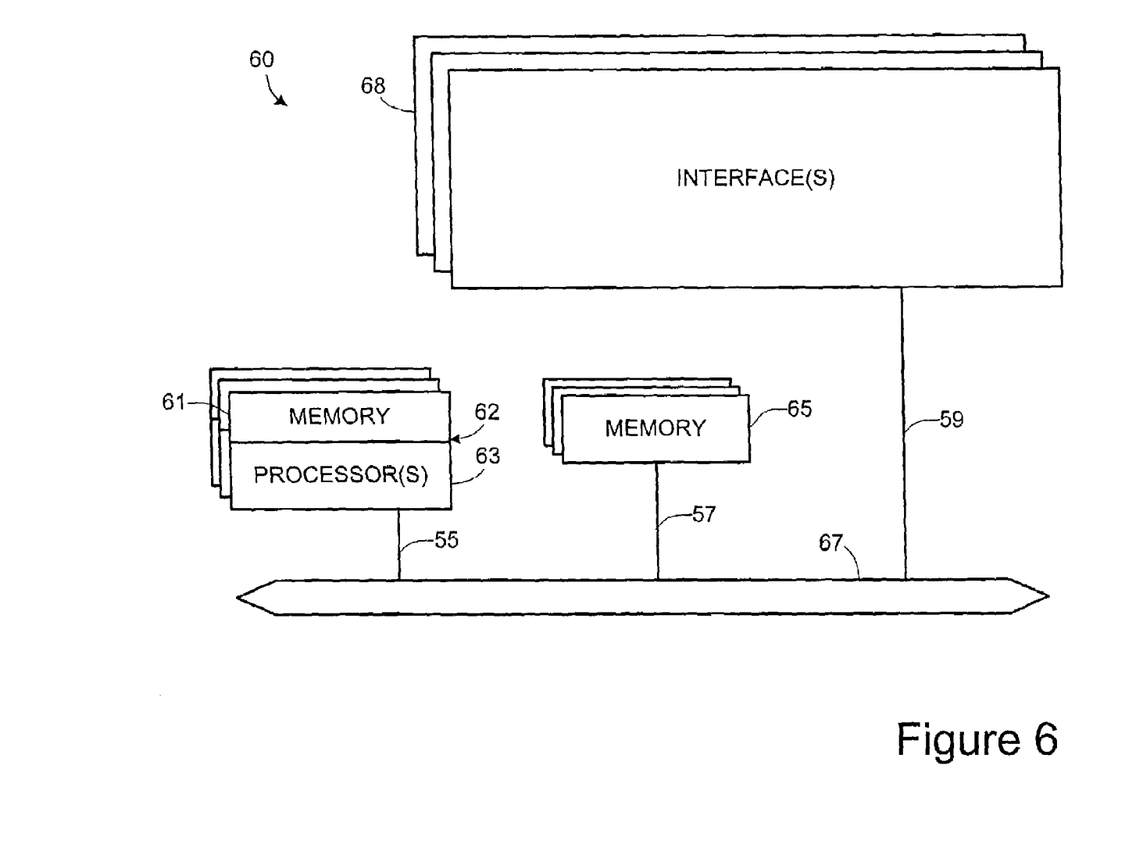
FIG. 6 shows a network device 60 suitable for implementing various aspects of the service locator techniques of the present invention.

Referring now to FIG. 6, a network device 60 suitable for implementing the service locator techniques of the present invention includes a master central processing unit (CPU) 62, interfaces 68, and a bus 67 (e.g., a clientI bus). When acting under the control of appropriate software or firmware, the CPU 62 may be responsible for implementing specific functions associated with the functions of a desired network device. For example, when configured as a network device, the CPU 62 may be responsible for analyzing packets, encapsulating packets, forwarding packets to appropriate network devices, processing DNS queries, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the service locator techniques described herein. The program instructions may control the operation of an operating system and/or one or more applications, for example. The memory or memories may also be configured to store data structures, network and/or site topology information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, storage media such as: magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM).

The invention may also be embodied in transmission media such as: a carrier wave traveling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for providing distributed service location information to a network device via a computer network, the method comprising:
   receiving a first lookup request from a first network device, the first lookup request including a request for obtaining at least one network address relating to a first service which is accessible via a first network address domain, the first lookup request further including network entity information relating to an identity of a first network entity; accessing network topology information relating to the computer network; dynamically selecting, using the network entity information and network topology information and network topology information, a first network address relating to the first service, wherein the selection of the first network address is based at least in part on the identity of the first network entity and selected network topology information; and generating a first response to the first lookup request which includes information relating to the first network address; wherein the first lookup request includes delegated domain information relating to the first network address domain; and wherein the network entity information is prepended to the delegated domain information.

2. The method of claim 1 wherein the network topology information includes at least one of: network site information, IP network information, network link information, and network link cost information.

3. The method of claim 1 further comprising:
   accessing service provider information, the service provider information including at least one of: information relating to an identity of different service providers, and IP address information associated with selected service providers.

4. The method of claim 1 further comprising: accessing service provider information, the service provider information including at least one of: information relating to an identity of different service providers, and IP address information associated with selected service providers; and generating enterprise service locator (ESL) topology information using selected network topology information and selected service provider information.

5. The method of claim 1 further comprising: accessing service provider information, the service provider information including at least one of: information relating to an identity of different service providers, and IP address information associated with selected service providers; and generating enterprise service locator (ESL) topology information using selected network topology information and selected service provider information; and modifying associations between the network topology information and service provider information based upon the ESL topology information.

6. The method of claim 1 wherein the first network entity corresponds to an entity other than the first network device.

7. The method of claim 1 further comprising: identifying a first plurality of network addresses in the first network address domain for accessing the first service; and selecting, using the network entity information and network topology information, the first network address from the first plurality of network addresses.

8. The method of claim 1: wherein the first lookup request further includes additional criteria relating to at least one first parameter, the method further comprising: identifying a first plurality of network addresses in the first network address domain for accessing the first service; and selecting, using the at least one first parameter, the first network address from the first plurality of network addresses, wherein the selection of the first network address is based at least in part on the identity of the first network entity, at least in part on network topology information relating to the first network entity, and at least in part on the at least one first parameter.

9. The method of claim 1: wherein the first lookup request further includes additional criteria relating to the selection of the requested at least one network address; and wherein said selecting includes using the network entity information, selected network topology information, and the additional criteria to select the first network address relating to the first service which is accessible via the first network address domain; wherein the selection of the first network address is based at least in part on the identity of the first network entity, at least in part on network topology information relating to the first network entity, and is further based at least in part on the additional criteria.

10. The method of claim 1: wherein the first lookup request further includes additional criteria relating to the selection of the requested at least one network address, the additional criteria including a first parameter relating to a desired quantity of the at least one network address to be provided in the first response; wherein said selecting includes using the network entity information and the additional criteria to select the first network address relating to the first service that is associated with the first network address domain, wherein the selection of the first network address is based at least in part on the identity of the first network entity, at least in part on network topology information relating to the first network entity, and is further based at least in part on the additional criteria.

11. The method of claim 1 further comprising: selecting, using the network entity information and network topology information, a second network address relating to the first service, wherein the selection of the second network address is based at least in part on the identity of the first network entity and also based at least in part on network topology information relating to the first network entity; and generating a first response to the first lookup request which includes information relating to the first network address and second network address; wherein the first network address and second network address adapted to provide said first service.

12. The method of claim 1 wherein the first network address corresponds to a first IP address.

13. The method of claim 1: wherein the first network device corresponds to a DNS server; and wherein the first network entity corresponds to a client system.

14. The method of claim 1: wherein said first network device corresponds to a DNS server; and wherein said first network entity corresponds to a proxy device.

15. The method of claim 1: wherein the lookup request includes a delegated domain portion; and wherein a first portion of the delegated domain includes a service locator identifier corresponding to a service location service.

16. The method of claim 1 wherein the network entity information includes service identifier information for identifying the first service.

17. The method of claim 1 wherein the network entity information includes a request for hostname information relating to a second identity of a second network device which generated the first response; and wherein the first response includes a first portion of hostname information indicating that the first response was generated by the second network device.

18. The method of claim 1 wherein the network entity information includes a request for site identification information relating to an identity of a network site associated with a specific network address; and wherein the first response includes a first portion of site identification information including an identity of the network site associated with the specific network address.

19. The method of claim 1 wherein network entity information includes a request for version information relating to an identity of at least one communication protocol implemented at a selected network device; and wherein the response includes a first portion of version information relating to the an identity of at least one communication protocol implemented at the selected network device.

20. A system for providing distributed service location information to a network device via a computer network, the system comprising:
at least one processor; at least one interface configured to provide a communication link to at least one other network device in the computer network; and memory; the system being configured to utilize the at least one processor to:
receive a first lookup request from a first network device, the first lookup request including a request for obtaining at least one network address relating to a first service which is accessible via a first network address domain, the first lookup request further including network entity information relating to an identity of a first network entity; access network topology information relating to the computer network; dynamically select, using the network entity information and network topology information, a first network address relating to the first service, wherein the selection of the first network address is based at least in part on the identity of the first network entity and also based at least in part on network topology information relating to the first network entity; and generate a first response to the first lookup request which includes information relating to the first network address; wherein the first lookup request includes delegated domain information relating to the first network address domain; and wherein the network entity information is prepended to the delegated domain information.

21. The system of claim 20 wherein the network topology information includes at least one of: network site information, IP network information, network link information, and network link cost information.

22. The system of claim 20 being further adapted to: access service provider information, the service provider information including at least one of: information relating to an identity of different service providers, and IP address information associated with selected service providers.

23. The system of claim 20 being further adapted to: access service provider information, the service provider information including at least one of: information relating to an identity of different service providers, and IP address information associated with selected service providers; and generate enterprise service locator (ESL) topology information using selected network topology information and selected service provider information.

24. The system of claim 20 being further adapted to: access service provider information, the service provider information including at least one of: information relating to an identity of different service providers, and IP address information associated with selected service providers; and generate enterprise service locator (ESL) topology information using selected network topology information and selected service provider information; and modify associations between the network topology information and service provider information based upon the ESL topology information.

25. The system of claim 20 wherein the first network entity corresponds to an entity other than the first network device.

26. The system of claim 20 being further adapted to: identify a first plurality of network addresses in the first network address domain for accessing the first service; and select, using the network entity information and network topology information, the first network address from the first plurality of network addresses.

27. The system of claim 20: wherein the first lookup request further includes additional criteria relating to at least one first parameter, the system being further adapted to: identify a first plurality of network addresses in the first network address domain for accessing the first service; and select, using the at least one first parameter, the first network address from the first plurality of network addresses, wherein the selection of the first network address is based at least in part on the identity of the first network entity, based at least in part on network topology information relating to the first network entity, and at least in part on the at least one first parameter.

28. The system of claim 20: wherein the first lookup request further includes additional criteria relating to the selection of the requested at least one network address; and the system being adapted to use the network entity information and the additional criteria to select the first network address relating to the first service which is accessible via the first network address domain, wherein the selection of the first network address is based at least in part on the identity of the first network entity, based at least in part on network topology information relating to the first network entity, and is further based at least in part on the additional criteria.

29. The system of claim 20: wherein the first lookup request further includes additional criteria relating to the selection of the requested at least one network address, the additional criteria including a first parameter relating to a desired quantity of the at least one network address to be provided in the first response; the system being adapted to use the network entity information and the additional criteria to select the first network address relating to the first service that is associated with the first network address domain, wherein the selection of the first network address is based at least in part on the identity of the first network entity, based at least in part on network topology information relating to the first network entity, and is further based at least in part on the additional criteria.

30. The system of claim 20 being further adapted to: select, using the network entity information and network topology information, a second network address relating to the first service, wherein the selection of the second network address is based at least in part on the identity of the first network entity and also based at least in part on network topology information relating to the first network entity; and generate a first response to the first lookup request which includes information relating to the first network address and second network address; wherein the first network address and second network address adapted to provide said first service.

31. The system of claim 20 wherein the first network address corresponds to a first IP address.

32. The system of claim 20: wherein the first network device corresponds to a DNS server; and wherein the first network entity corresponds to a client system.

33. The system of claim 20: wherein said first network device corresponds to a DNS server; and wherein said first network entity corresponds to a proxy device.

34. The system of claim 20: wherein the lookup request includes a delegated domain portion; and wherein a first portion of the delegated domain includes a service locator identifier corresponding to a service location service.

35. The system of claim 20 wherein the network entity information includes service identifier information for identifying the first service.

36. The system of claim 20 wherein the network entity information includes a request for hostname information relating to a second identity of a second network device which generated the first response; and wherein the first response includes a first portion of hostname information indicating that the first response was generated by the second network device.

37. The system of claim 20 wherein the network entity information includes a request for site identification information relating to an identity of a network site associated with a specific network address; and wherein the first response includes a first portion of site identification information including an identity of the network site associated with the specific network address.

38. The system of claim 20 wherein network entity information includes a request for version information relating to an identity of at least one communication protocol implemented at a selected network device; and wherein the response includes a first portion of version information relating to the an identity of at least one communication protocol implemented at the selected network device.

39. A computer program product for providing distributed service location information to a network device via a computer network, the computer program product comprising: a machine readable storage medium having computer readable code embodied therein, the computer readable code comprising: computer code for receiving a first lookup request from a first network device, the first lookup request including a request for obtaining at least one network address relating to a first service which is accessible via a first network address domain, the first lookup request further including network entity information relating to an identity of a first network entity; computer code for accessing network topology information relating to the computer network; computer code for dynamically selecting, using the network entity information and network topology information, a first network address relating to the first service, wherein the selection of the first network address is based at least in part on the identity of the first network entity and also based at least in part on network topology information relating to the first network entity; and computer code for generating a first response to the first lookup request which includes information relating to the first network address; wherein the first lookup request includes delegated domain information relating to the first network address domain; and wherein the network entity information is prepended to the delegated domain information.

40. The computer program product of claim 39 wherein the first network entity corresponds to an entity other than the first network device.

41. The computer program product of claim 39 further comprising: computer code for identifying a first plurality of network addresses in the first network address domain for accessing the first service; and computer code for selecting, using the network entity information and network topology information, the first network address from the first plurality of network addresses.

42. The computer program product of claim 39: wherein the first lookup request further includes additional criteria relating to at least one first parameter, the computer program product further comprising: computer code for identifying a first plurality of network addresses in the first network address domain for accessing the first service; and computer code for selecting, using the at least one first parameter, the first network address from the first plurality of network addresses, wherein the selection of the first network address is based at least in part on the identity of the first network entity, based at least in part on network topology information relating to the first network entity, and at least in part on the at least one first parameter.

43. The computer program product of claim 39: wherein the first lookup request further includes additional criteria relating to the selection of the requested at least one network address; and wherein said selecting code includes using the network entity information and network topology information and the additional criteria to select the first network address relating to the first service which is accessible via the first network address domain, wherein the selection of the first network address is based at least in part on the identity of the first network entity, based at least in part on network topology information relating to the first network entity, and is further based at least in part on the additional criteria.

44. The computer program product of claim 39: wherein the first lookup request further includes additional criteria relating to the selection of the requested at least one network address, the additional criteria including a first parameter relating to a desired quantity of the at least one network address to be provided in the first response; wherein said selecting code includes using the network entity information and network topology information and the additional criteria to select the first network address relating to the first service that is associated with the first network address domain, wherein the selection of the first network address is based at least in part on the identity of the first network entity, based at least in part on network topology information relating to the first network entity, and is further based at least in part on the additional criteria.

45. The computer program product of claim 39 further comprising: computer code for selecting, using the network entity information and network topology information, a second network address relating to the first service, wherein the selection of the second network address is based at least in part on the identity of the first network entity and also based at least in part on network topology information relating to the first network entity; and computer code for generating a first response to the first lookup request which includes information relating to the first network address and second network address; wherein the first network address and second network address adapted to provide said first service.

46. The computer program product of claim 39 wherein the first network address corresponds to a first IP address.

47. The computer program product of claim 39: wherein the first network device corresponds to a DNS server; and wherein the first network entity corresponds to a client system.

48. The computer program product of claim 39: wherein said first network device corresponds to a DNS server; and wherein said first network entity corresponds to a proxy device.

49. A system for providing distributed service location information to a network device via a computer network, the system comprising: a first processor; a memory; means for receiving a first lookup request from a first network device, the first lookup request including a request for obtaining at least one network address relating to a first service which is accessible via a first network address domain, the first lookup request further including network entity information relating to an identity of a first network entity; means for accessing network topology information relating to the computer network; means for dynamically selecting, using the network entity information and network topology information, a first network address relating to the first service, wherein the selection of the first network address is based at least in part on the identity of the first network entity and also based at least in part on network topology information relating to the first network entity; and means for generating a first response to the first lookup request which includes information relating to the first network address; wherein the first lookup request includes delegated domain information relating to the first network address domain; and wherein the network entity information is prepended to the delegated domain information.

50. The system of claim 49 wherein the first network entity corresponds to an entity other than the first network device.

51. The system of claim 49 further comprising: means for identifying a first plurality of network addresses in the first network address domain for accessing the first service; and means for selecting, using the network entity information and network topology information, the first network address from the first plurality of network addresses.

52. The system of claim 51 wherein the network topology information includes at least one of: network site information, IP network information, network link information, and network link cost information.

53. The system of claim 51 further comprising: means for accessing service provider information, the service provider information including at least one of: information relating to an identity of different service providers, and IP address information associated with selected service providers; and means for generating enterprise service locator (ESL) topology information using selected network topology information and selected service provider information; and means for modifying associations between the network topology information and service provider information based upon the ESL topology information.

54. A method for providing distributed service location information to a network device via a computer network, the method comprising:
receiving a first lookup request from a first network device, the first lookup request including a request for obtaining at least one network address relating to a first service which is accessible via a first network address domain, the first lookup request further including network entity information relating to an identity of a first network entity; identifying a plurality of network addresses relating to the first service including a first network address and a second network address; accessing network topology information relating to the computer network;

dynamically selecting, using the network entity information and network topology information and network topology information, a preferred network address relating to the first service, wherein the selection of the preferred network address is based at least in part on the identity of the first network entity and also based at least in part on network topology information relating to the first network entity and selected network topology information; and generating a first response to the first lookup request which includes information relating to the preferred network address; wherein the first lookup request includes delegated domain information relating to the first network address domain; and wherein the network entity information is prepended to the delegated domain information.

* * * * *